Oct. 25, 1960

E. H. FREUND ET AL 2,957,770

METHOD OF IMPROVING THE PROPERTIES
OF MEAT AND COMPOSITION THEREFOR

Filed Oct. 28, 1957

STRESS-STRAIN RELATIONSHIP OF GELS

TEST 18

100 GM. 3% CASEIN SOLUTION
10.8 MILLIMOLS $CaCl_2$
5.4 MILLIMOLS $Na_4P_2O_7$
2.08 MILLIMOLS $Na_2HPO_4$
RATIO OF $\frac{CaCl_2}{Na_2HPO_4}$ = 5.2

FIG.2A.

TEST 19

100 GM. 3% CASEIN SOLUTION
10.8 MILLIMOLS $CaCl_2$
5.4 MILLIMOLS $Na_4P_2O_7$
3.18 MILLIMOLS $Na_2HPO_4$
RATIO OF $\frac{CaCl_2}{Na_2HPO_4}$ = 3.4

FIG.2B.

TEST 20

100 GM. 3% CASEIN SOLUTION
10.8 MILLIMOLS $CaCl_2$
5.4 MILLIMOLS $Na_4P_2O_7$
6.3 MILLIMOLS $Na_2HPO_4$
RATIO OF $\frac{CaCl_2}{Na_2HPO_4}$ = 1.7

FIG.2C.

TEST 21

3% GELATIN GEL

FIG.2D.

INVENTORS
ERNEST H. FREUND
EDWARD N. DANES, JR.
BY

*Brumbaugh, Free, Graves & Donohue*

THEIR ATTORNEYS

United States Patent Office 2,957,770
Patented Oct. 25, 1960

2,957,770

METHOD OF IMPROVING THE PROPERTIES OF MEAT AND COMPOSITION THEREFOR

Ernest H. Freund, Sayville, and Edward N. Danes, Jr., Oceanside, N.Y., assignors to National Dairy Products Corporation, New York, N.Y., a corporation of Delaware Filed Oct. 28, 1957, Ser. No. 692,650

22 Claims. (Cl. 99—107)

This invention relates to gel forming compositions containing casein and to their use in improving the properties of foods, cosmetics, textiles and other products.

Heretofore, products such as milk or skim milk have been used in combination with polyphosphates (pyrophosphates) to modify the properties of food products. Patents which describe the use of pyrophosphate in the presence of skim milk are e.g. U.S. Patents No. 2,739,898 to K. Kumetat, No. 2,468,677 to T. W. Lindewald and No. 2,341,425 to C. C. Curry. These patents deal with the preparation of egg substitutes or skim milk colloids. The compositions prepared in accordance with these patents had either an increased viscosity or formed soft gels, but in no case was a gel strength over a few grams per sq. cm. of gel surface obtained.

An object of the present invention is the preparation of proteinaceous gel compositions.

Another object is to prepare such gels having a gel strength above 10 gm. per sq. cm. per percent casein present in the composition.

Another object is to utilize the casein derived from skim milk to improve the properties of food and other products.

Still another object is to utilize casein derived from skim milk in the sizing of textile fibers and similar products.

Still another object is to prepare foams by whipping gel forming compositions, which if allowed to gel in an unwhipped state, would have a gel strength above 10 gm. per sq. cm. per percent casein present in the composition.

Still another object of the invention is to prepare persistent foams which have a high water binding capacity and are useful as egg white substitutes in the preparation of baked goods, confections, and other foods.

Still another object is to use casein compositions to stabilize emulsions.

Another object of the invention is to utilize casein compositions in the improvement of the water binding capacity, in the reduction of the shrinkage and to minimize the migration of fat in meat products.

Other objects and advantages of the invention will appear from the following description.

It has been discovered that gels of substantial strength can be obtained from aqueous solutions containing four basic components, viz. casein, a source of calcium, orthophosphate and pyrophosphate at certain levels and in certain ratios.

Figure 2 presents a number of graphs shown as the component drawings of Figures 2A, 2B, 2C and 2D illustrating the stiffness of several gels.

Calcium, orthophosphate and casein are, of course, present in normal milk, and weak gels can be obtained, if pyrophosphate is added to concentrated milk or if the mol ratio of calcium to pyrophosphate is adjusted to much higher values than those which give optimum strength for our casein gels. However, if the same amount of pyrophosphate as will produce optimum gel strength according to our invention is added to milk no gelation occurs, whereas if a calcium compound, an orthophosphate and an aqueous sodium caseinate solution are mixed in the same concentrations in which they occur in milk and if sodium tetrapyrophosphate is added to this solution in an amount such that the molar ratio of calcium to pyrophosphate is about 2, then a strong gel is obtained. These differences in gel forming properties between milk and a composition prepared from sodium caseinate are shown and discussed more fully below.

On the average skim milk contains three of the basic components in about the following amounts per 100 cc.:

2.8 gm. casein
2.5 millimols of an inorganic orthophosphate
3.15 millimols calcium equal to .126 gm. Ca or 0.35 gm. $CaCl_2$ If to 100 cc. of milk 1.58 millimols or 0.42 gm. of sodium pyrophosphate are added, no gels are obtained. In the above mixture the ratio of calcium to pyrophosphate is 2. However, gels with gel strength of substantial magnitudes are obtained if an aqueous solution is prepared consisting of the four basic components in the same concentration as in the example above. Such a synthetic mixture is prepared by dissolving in 100 cc. water:

2.84 gm. sodium caseinate containing 2.8 gm. casein
0.35 gm. calcium chloride (equivalent to 3.15 millimols calcium)
0.365 gm. $Na_2HPO_4$ (equivalent to 2.5 millimols orthophosphate)
0.42 gm. sodium pyrophosphate (equivalent to 1.58 millimols)

If the homogeneous mixture is allowed to stand for 12 hours at 7° C., the strength of the formed casein gel will be about 65 gm. per sq. cm. per gm. of casein present in the gel.

The failure of milk to form gels of substantial strength, although it contains the four basic constituents in the same amounts and ratios as they are used in the synthetic mixtures, might be caused by the following reasons:

(1) Only a minor part of the calcium present in milk is available for gel formation. The addition of pyrophosphate in the indicated amount increases somewhat the availability of the milk calcium, but its concentration is not sufficient to provide for a proper ratio of calcium pyrophosphate necessary for the formation of a strong gel.

(2) Divalent metallic ions in milk like Mg are responsible for lowering or destroying the gel strength.

(3) Sequestration agents for calcium, which are normally present in milk, like citric acid and its salts, lower the gel strength also.

(4) Although the presence of alkali salts like NaCl or KCl has normally little influence on the strength of casein gels, they lower the gel strength considerably in the presence of other milk constituents such as sequestering agents (citric acid) or divalent cations (magnesium).

(5) The order of addition of the four basic components which is more fully discussed later has a great influence on the gel strength.

Moreover, the factors enumerated above which tend to lower gel strength, when combined might cause a larger loss of gel strength than would be expected by adding the individual effects of the single factors.

Gel compositions which have been prepared under favorable conditions and in which the components are in optimum ratios have gel strengths of about 100 gm. per sq. cm. per percent casein present. However, gels having such high strength are in some cases unnecessary. We include within the scope of the invention not only the gels with the highest strength and containing the optimum ratio of the four basic components, but also all of the casein gels which have a strength of over 10 gm. per sq. cm. per percent casein. Preferably, however, the gel forming compositions are formulated to have a strength of about 30 gm. per sq. cm. per percent casein.

The gel strength is measured by a Baker Compressimeter according to the procedure described in Cereal Laboratory Methods, Fourth Edition, 1941, published by American Association of Cereal Chemists, pages 134–137. This instrument compresses a portion of the gel between a round plastic disc and a supporting surface. Two scales are provided for measuring the stress and the strain. "Gel strength" is read as the stress measurement at which the disc ruptures the gel surface.

In some cases, it is convenient and significant to measure other properties of the compositions, such as the structural strength referred to as "foam stiffness" of foams of compositions which have been whipped. In other cases it is important to take cognizance of the water retention of foams and gels and in these cases measurements thereof are given and discussed.

Since the strength of the gels may be substantially affected by the nature of the four basic components and by their ratios, we shall now describe the manner of preparing gels having the maximum strength and the consequences of deviating from the optimum ratios of the four basic components. We shall also describe other factors which influence the gel strength, such as the order of addition, the presence of gel strength lowering compounds, etc.

GEL COMPONENTS

As mentioned above, the basic ingredients used in the compositions of the invention are casein, pyrophosphate, a source of calcium and orthophosphate.

It is known that casein as it occurs in milk consists of several components which can be separated into several fractions. We have found that beta casein does not form gels with proper amounts of calcium, pyro phosphate and orthophosphate, while alpha casein forms gels with these basic components.

The casein may be prepared by the addition of acids to skim milk to cause precipitation of the casein at its isoelectric point, or by the natural souring of the milk or by any other known methods. Furthermore, instead of separating the casein from the skim milk, the components of the milk which lower gel strength may be removed, leaving substantially only the casein and the components which do not adversely affect gel strength. Such a process is described in the U.S. Patent No. 2,708,623 to E. Stimpson and consists in principle of removal of metals and acids from milk. The casein must be present in a water soluble state, for example, as an alkali caseinate, or other suitable form, e.g., calcium caseinate which is solubilized by the other components of the gel composition. The amount of casein is preferably at least about 1 percent by weight based on the composition.

Another of the basic components is the calcium ingredient. The calcium may be provided by the use of calcium caseinate, or by the addition of soluble calcium salts to the casein solution, such as calcium chloride, calcium acetate, etc. Although the use of soluble calcium salts is preferred, the addition of slightly soluble calcium compounds is also within the scope of the invention if they form a homogeneous solution in the system. That is, a calcium compound that produces a calcium ion that is capable of being sequestered by the caseinate and the pyrophosphate can be used. Lime can also be used as a source of calcium. However, the pH of the gel forming mixture must be regulated so that the final pH is within the range where gel formation takes place as hereinafter described.

Pyrophosphates which can be used include tetra alkali pyrophosphates, such as $Na_4P_2O_7$ and the more acid salts of pyrophosphoric acid. Other polyphosphates, such as hexametaphosphates, tripolyphosphates, etc. do not produce strong gels.

The orthophosphates which can be used include orthophosphoric acid and the alkali and calcium salts of orthophosphoric acid, insofar as these salts are soluble in water or are solubilized by the pyrophosphate present as one of the components of the gel forming system.

Influence of gel strength lowering milk constituents on the gel strength

As mentioned earlier, there are certain milk constituents which, if added to the four basic gel components, lower or destroy the gel strength of the composition. Such effects are described in Table 1. Some of these milk constituents lower the gel strength considerably if added alone to the gel composition, others cause only a slight lowering of the gel strength if added alone, but show a synergistic effect in lowering the gel strength greatly if added together with other milk constituents. By utilizing casein or skim milk which has had the gel strength lowering factors removed in accordance with the invention, instead of skim or whole milk, higher strength gels may be produced.

TABLE 1.—DEPENDENCY OF GEL STRENGTH UPON THE ADDITION OF MILK COMPONENTS TO CASEIN GEL COMPOSITIONS

| Test | Millimols | | | | | Gel Strength | |
|---|---|---|---|---|---|---|---|
| | NaCl | KCl | Na Citrate | Lactose | $MgCl_2$ | 7° C. | 23° C. |
| 1 | | | | | | 322 | |
| 2 | | | | 13.9 | | 312 | 248 |
| 3 | 3.08 | 3.75 | | | | 272 | |
| 4 | 3.08 | 3.75 | | 13.9 | | 162 | |
| 5 | | | | | .57 | 123 | |
| 6 | | | | 13.9 | .57 | 115 | 74 |
| 7 | 3.08 | 3.75 | | 13.9 | .57 | 82 | 41 |
| 8 | | | 1.05 | | | 200 | |
| 9 | | | 1.05 | 13.9 | | 181 | 115 |
| 10 | 3.08 | 3.75 | 1.05 | 13.9 | | 82 | 41 |
| 11 | 3.08 | 3.75 | 1.05 | 13.9 | .57 | 77 | 24 |

All quantities are based on 100 gm. of solution: 1.81 millimols $Na_4P_2O_7$ per 100 gm. of solution (.48 gm.). 3.6 millimols $CaCl_2$ per 100 gm. of solution (.40 gm.). 1.2 millimols $Na_2H PO_4$ per 100 gm. of solution (.17 gm.).
Sample had 3.0 gm. of casein per 100 gm. of solution.

Samples were prepared by dissolving the casein in aqueous NaOH at pH 6.6, adjusting the temperature, adding the other basic components or milk constituents in the order given above and allowing the compositions to stand for 16 hours at 7° C., after which time gel strength was measured.

As typical examples of the gel strength lowering action of milk constituents are mentioned magnesium compounds and citrate, Tests 5 and 8, respectively.

Milk constituents showing a weak effect, if added alone, are sodium, potassium and lactose (Tests 3 and 2). The synergistic effect of these constituents with other milk constituents on the gel strength is shown for example in Test 10 (for sodium, potassium, citrate and lactose) and in other tests described in the table.

Order of addition

In preparing the gels of the invention, several procedures can be used. One is to dissolve the components of the gel forming composition in water, another consists of mixing aqueous solutions of the components. The compositions are then allowed to stand until the gels are produced.

It has been found that the order of addition of the components to an aqueous medium or the order of mixing the aqueous solutions of the single components has a definite influence on the gel strength.

The effect of the order of addition of the gel forming components may be seen in Table 2 which summarizes the results of experiments in which various orders of addition were used. In all experiments described in Table 2 a 5% aqueous casein solution was used and then the single components were added in the form of their 7% aqueous solutions in the order specified in Table 2 and each addition was homogeneously distributed. After all additions were made the mixture was adjusted with water to a casein concentration of 3%. In all cases the temperature of mixing was 7° C. and the fourth component was added only after the mixture of the three other components had been allowed to stand at 7° C. for one hour. Gel strength was measured after allowing the composition to stand at 7° C. for 16 hours.

TABLE 2.—EFFECT OF ORDER OF ADDITION OF GEL COMPONENTS ON GEL STRENGTH

| Test | Order of Addition | Optimum Gel Strength |
| --- | --- | --- |
| 12 | Cas-P-C-O | 296 |
| 13 | Cas-C-P-O | 205 |
| 14 | Cas-P-O-C | 282 |
| 15 | Cas-O-P-C | 288 |
| 16 | Cas-O-C-P | 98 |
| 17 | Cas-C-O-P | 115 |

Cas—sodium caseinate _____________________ 3.0 gm. per 100 gm. of solution.
P—tetrasodium pyrophosphate _______________ .48 gm. per 100 gm. of solution (1.81 millimols).
C—calcium chloride _________________________ .40 gm. per 100 gm. of solution (3.6 millimols).
O—disodium phosphate (orthophosphate) ____ .15 gm. per 100 gm. of solution (1.1 millimols).

It can be seen from Table 2 that gels with high strength were obtained in all those cases in which the pyrophosphate was added to the casein solution before the addition of the calcium was made. In those cases in which the calcium was added before the pyrophosphate, the gel strength was substantially lower. The order in which orthophosphate was added seemed to cause only a slight difference in those cases in which pyrophosphate was added before the calcium. However, a substantial loss of gel strength was encountered in those cases in which both the calcium and the orthophosphate were added to the casein solution before the pyrophosphate. It is believed that in the latter case the formation of insoluble calcium phosphate disturbed the balance of the active components.

While the reason for the occurrence of this phenomenon is not fully understood, it is believed that the addition of a calcium compound to the casein in the absence of a fast acting sequestering agent such as sodium pyrophosphate causes a change in the gel forming properties of casein.

The order of mixing is important in the preparation of dry mixes. If a dry mix is made by blending a soluble casein compound such as sodium caseinate and the other three basic components in the form of their water soluble salts and such a dry mix is dissolved in water, the casein compound dissolves at a slower rate than the other water soluble components. Inasmuch as a gel composition prepared in such fashion does not follow the recommended order of addition, the gel strength will be relatively low. Possible remedies include the coating of the calcium compound to effect a slow dissolution thereof.

*The influence of the temperature on gel formation*

We have found that the temperature of mixing the four basic gel components and the temperature of the gel formation influence the gel strength in such a way that at higher temperature lower gel strength is obtained. Some of these differences are demonstrated in Table 1 where various gel compositions were prepared at 7° C. and at 23° C. In every case the higher temperature of preparation resulted in a lowering of the gel strength. The differences become larger if mixing temperature and gelation temperature are increased. If casein, pyrophosphate and calcium are mixed and the mixture is held for a certain time before adding the orthophosphate, the temperature of this holding time has a similar influence on the gel strength as the mixing temperature or gelation temperature.

*Complex formation*

It has been found that an aqueous solution comprising casein, pyrophosphate and a source of calcium in optimum ratios (described below), but containing no orthophosphate, forms a water soluble complex. This complex can be separated from the aqueous solution either by precipitating it with an acid at a pH of 4.7 or by subjecting the aqueous solution to the action of a super centrifuge (e.g. Sharples type T-66-24) for one hour at 35,000 gravity.

The complex which has been separated by super-centrifuging has ratios of phosphorous to nitrogen (P/N) and calcium to nitrogen (Ca/N) similar to those of the original solution.

If the complex is redissolved in water to a solution containing about 4% solids and orthophosphate is added in the ratio of 0.33 millimol orthophosphate for one millimol of calcium present, both based on 100 gm. of total gel forming composition, then a firm gel is formed.

It is theorized that the soluble complex is formed of chains, consisting of casein, pyrophosphate and calcium, whereby the calcium is connected in such a way with the other components of the complex that the formed complex may act as a monovalent cation per calcium atom and thus enable the complex to undergo metathetical reactions in which calcium is retained in the complex. Calcium might act as a connecting bridge between the pyrophosphate and the casein in the complex and the linkages might consist of electrostatic and coordinated bonds. It is also believed that the electrostatic bond between calcium and pyrophosphate is quite stable because of the low hydration of the calcium pyrophosphate part, which might exist as microcrystals within the complex.

By the addition of orthophosphate, the complex is insolubilized by a metathetical reaction which takes place between the orthophosphate and the calcium without dissolving the calcium pyrophosphate bond or the coordinated calcium-casein bond. This insoluble structure consists of the orthophosphate linked with several Ca-complexes by ionic bonds, which function as cross linkages. The highest possible number of cross linkages which can be formed occurs when one orthophosphate reacts with three monovalent calcium complexes. It is known that the rigidity of high polymeric substances increases with the number of cross linkages. We have found that gels having the optimum orthophosphate content and the highest gel strength have also the greatest rigidity. Thus they have less deformation per unit of stress and higher modulus, i.e., a higher slope of the stress-strain curve. This is the case if the mol ratio of calcium to orthophosphate is about 3:1. If this ratio is changed either by increase or decrease, then the rigidity of the gel composition decreases. Such stress-strain relationship in comparison with gelatine gels are described in Figure 2.

It has also been observed that gel formation coincides with a drop in pH, which varies in the range of 0.1–0.4 of a unit. This drop might be explained by the following reaction:

$$3R\text{—}Ca\text{—}A + Na_2HPO_4 \rightarrow ((R\text{—}Ca)_3PO_4 + 2NaA + AH$$

where R is the casein pyrophosphate complex connected with Ca and A is a monovalent anion connected with or within the complex. The pH drop might be explained by the formation of AH.

The above equation is analogous to the known reaction:

$$3CaCl_2 + 2Na_2HPO_4 \rightarrow Ca_3(PO_4)_2 + 4NaCl + 2HCl$$

*Influence of ratios and amounts of the gel components on the gel strength*

The results of a number of tests have established that gel strength is dependent upon the respective amount of the four basic components used and their ratios to each other.

In order to obtain optimum conditions the four basic components have to be used in ratios which produce the highest gel strength for a given casein concentration.

Optimum ratios have been derived by averaging a large number of tests, sometimes under slightly changed conditions, as to the casein source, temperature and time of mixing, temperature and time of gelling, etc.

Gel strength that is near to the optimum is obtained if for each gram of casein the other basic components are used in the following amounts:

$$\left.\begin{array}{l}Ca=2Cs\\Py=0.5Ca\\OP=0.33Ca\end{array}\right\}\text{Formula A}$$

wherein Ca, Py and OP express the millimols of calcium, pyrophosphate and orthophosphate and Cs the grams of casein used in 100.0 gm. of the gel composition.

It will be observed that the mol ratio of calcium compound to pyrophosphate is about 2 to 1 in Formula A. Moreover, for each percent by weight of water-soluble material derived from the casein complex present, there are 2 gram millimols per 100 grams of gel of soluble calcium compound, 1 gram millimol per 100 grams of gel of pyrophosphate and 0.66 millimol of orthophosphate per 100 grams of gel.

The above relationship gives good results at low casein concentrations. However, at higher casein concentrations, e.g., 3% and higher, the optimum relationships can be approached still more closely by using the formula:

$$\left.\begin{array}{l}Ca=1.94Cs+0.143\\Py=0.438Ca+0.1\\OP=0.33Ca\end{array}\right\}\text{Formula B}$$

Figure 1:
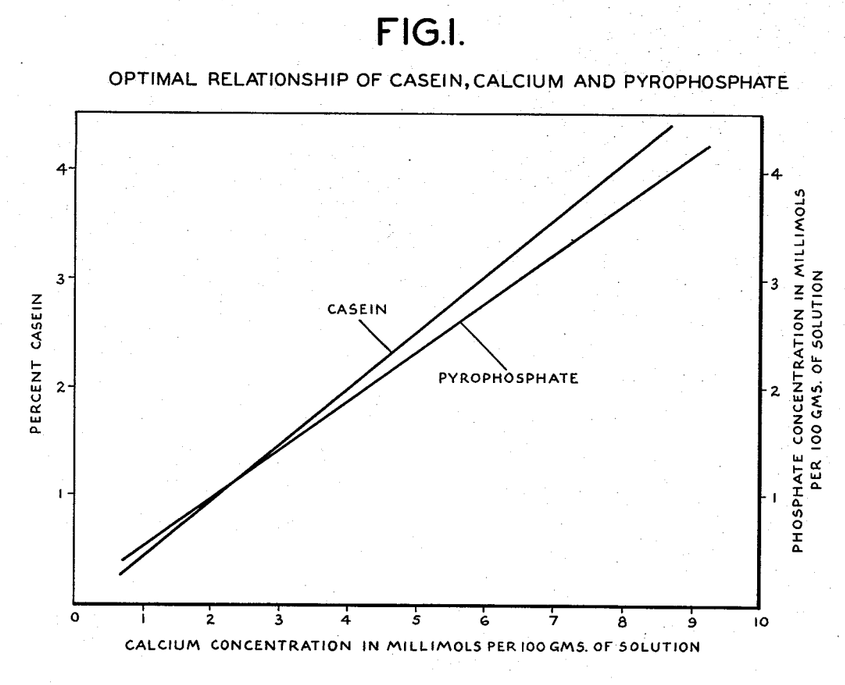
Figure 1 is a graph showing optimum ratios between calcium, pyrophosphate and orthophosphate for maximum gel strength.
Figure 2A:
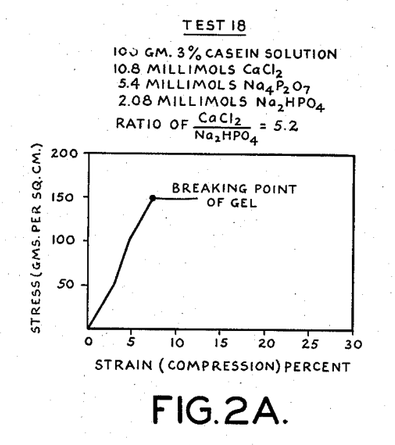
Figure 2B:
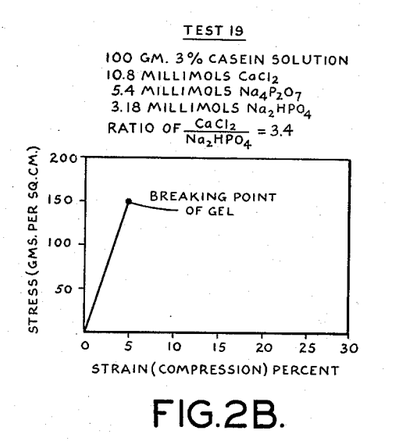
Figure 2C:
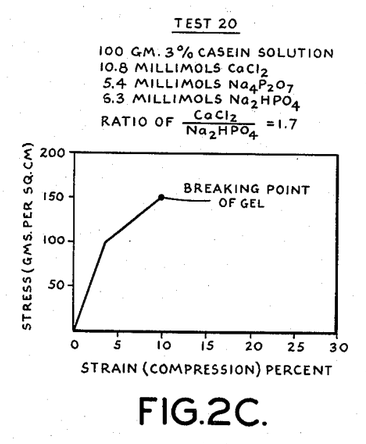
Figure 2D:
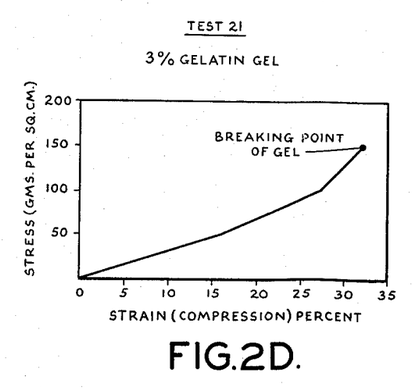

These relationships, which are derived from a large number of tests, are plotted in Figure 1.

Any casein or sodium caseinate of good quality will work satisfactorily. However, it is preferred to use a commercially available casein or sodium caseinate.

"Sheftene" sodium caseinate and "Sheffield" New Process Casein have been found very satisfactory. In using caseins or sodium caseinate of varying composition, it may be necessary to alter slightly the mol ratios of the other three basic components in order to secure gels of optimum strength as will be apparent to one skilled in the art.

If gel compositions are prepared in which the basic components are in the above ratios, gel strength is about proportional to the casein concentration. If "Sheffield" New Process Casein is used as a source of casein, the gel strength is about 100 gm. per sq. cm. for each gm. of casein present in 100 cc. of the gel composition. Other non-degraded caseins yield gels of similar strength.

In order to prepare gels of lesser gel strength having a strength of at least 10 gm. per sq. cm. per percent casein, the four basic components may be combined in ratios which vary from the optimum conditions considerably. It may be generally stated that the percentile loss of gel strength caused by deviation from the optimum ratios of the basic components is larger the lower the casein concentration in the gel composition. However, any change from the optimum ratio either by an increase or decrease of the concentration of only one or of a plurality of components results in a lowering of gel strength compared with those values obtained at optimum ratio.

Changing the ratio between the casein and the other components, the latter being in optimum relationship with each other, decreases the gel strength. If the concentration of the other components is increased above the optimum concentration in respect to the casein component present, then the gel strength of the gel composition will be decreased by a proportion approximately equal to the percentage increase of the other components. This approximation applies only if the deviation from the optimum concentrations is not greater than 50%.

The optimum gel strengths are produced when the amount of calcium present is about 2 millimols per gram of casein component, as indicated in Formula A and Formula B. However, strong gels can be made over a wide range of ratios of calcium to casein. Preferably, this ratio is in the approximate range of 0.2 to 5 millimols of calcium per gram of casein component.

In like manner, changing the amount of pyrophosphate produces an effect.

TABLE 3.—INFLUENCE ON GEL STRENGTH OF DEVIATIONS FROM OPTIMUM AMOUNT OF PYROPHOSPHATE

| Test | Na₄P₂O₇ g./100 | Na₄P₂O₇ millimol/100 | Molar Ratio, CaCl₂ Na₄P₂O₇ | Gel Strength | Percent of Optimum Gel Strength | Percent Deviation from Optimum Pyrophosphate Content |
|---|---|---|---|---|---|---|
| 22 | 1.06 | 3.98 | 1.5 | 71 | 20.2 | 45 |
| 23 | .996 | 3.75 | 1.6 | 57 | 16.3 | 37 |
| 24 | .93 | 3.49 | 1.72 | 82 | 23.4 | 27 |
| 25 | .865 | 3.25 | 1.84 | 205 | 58.6 | 18 |
| 26 | .8 | 3.0 | 2.00 | 322 | 92 | 9 |
| 27 | .73 | 2.75 | 2.18 | 350 | 100 | 0 |
| 28 | .665 | 2.5 | 2.40 | 330 | 94.5 | 9 |
| 29 | .6 | 2.25 | 2.67 | 205 | 58.6 | 18.2 |
| 30 | .532 | 2.0 | 3.0 | 156 | 44.6 | 27.3 |
| 31 | .482 | 1.81 | 3.32 | 73 | 20.8 | 34 |

The samples were prepared at 6° C. Order of addition of the gel components was: casein-pyrophosphate-calcium chloride-orthophosphate.
The amount of Na₂HPO₄ used for 100 gm. of composition was 0.284 gm.
Gel strength was measured after the mixed components had been allowed to stand at 6° C. for 16 hours.
Casein concentration=3%.
CaCl₂: .67 gm. per 100 gm. solution (6.0 millimols).

In Table 3 tests are described in which the concentrations of three components were kept constant and only the concentration of pyrophosphate was varied. Optimum gel strength was obtained when the mol ratio of calcium to pyrophosphate was 2.18, which is the optimum ratio for the casein concentration used. However, the gel strength decreased if the pyrophosphate concentration was lowered or increased. Expressing as $y$ the gel strength in percent of optimal gel strength, and as $x$ the percentile deviation of pyrophosphate from the optimum pyrophosphate amount, an equation is obtained which describes the relationship between them $$\frac{y}{100}=e^{-\frac{1}{2}\left(\frac{\frac{x}{100}-1}{0.17}\right)^2}$$

This approximation makes it possible to estimate the influence on the gel strength of compositions containing pyrophosphate concentration, which differ from the optimum pyrophosphate concentration, but applies only if the deviations are smaller than 30%. Generally, it is preferred to use calcium compound and pyrophosphate in molar ratio in the range of about 1.5 to about 3.3 calcium to pyrophosphate, as shown in Table 3.

If the ratio of calcium to pyrophosphate in a gel composition is higher than the optimum requirements, then it is necessary to increase the orthophosphate concentration for obtaining gels of high strength. The excess of orthophosphate at such higher calcium concentrations is about one millimol of orthophosphate for each millimol of calcium in excess of the optimum calcium-pyrophosphate ratio. The influence of the calcium-orthophosphate ratio on the gel strength is less apparent than the influence of the calcium-pyrophosphate ratio. Using the calcium-orthophosphate ratios of 1:1 or 9:1 (instead of the optimum 3:1), causes in certain cases a loss of about 50% of the optimum gel strength. However, as previously mentioned, we have found that the rigidity of gel compositions is dependent upon the orthophosphate concentration used.

Estimates of the decrease of gel strength by several deviations from the optimum ratios can be made by adding the influences of the single deviations on the gel strength.

Influence of pH

The influence of the pH on the gel strength was determined and it was found that below a pH of 5.3 and above 9, no gels, or gels with a strength of less than 10 gm. per sq. cm. per percent casein were formed. The optimum pH range for gel formation is between 6.5 and 7.5. It had also been found that the amount of orthophosphate can be lowered if the pH of the gel composition is somewhat increased. However, a minimum amount of orthophosphate must be present to effect gel formation. The influence of pH on the gel strength is described in Table 4.

TABLE 4.—THE INFLUENCE OF pH ON GEL STRENGTH

| Test | $Na_2HPO_4$, millimols | pH I | NaOH, mg./100 gm. | pH II | pH III | Gel Strength |
|---|---|---|---|---|---|---|
| 32 | .14 | 6.9 | 0 | 6.9 | 6.6 | 62 |
| 33 | .21 | 6.9 | 0 | 6.9 | 6.6 | 66 |
| 34 | .28 | 7.0 | 0 | 7.0 | 6.7 | 106 |
| 35 | .35 | 7.0 | 0 | 7.0 | 6.65 | 106 |
| 36 | .49 | 7.15 | 0 | 7.15 | 6.8 | 132 |
| 37 | .7 | 7.15 | 0 | 7.15 | 7.0 | 137 |
| 38 | 0 | 6.75 | 0 | 6.75 | 6.8 | 0 |
| 39 | 0 | 6.7 | 52 | 7.08 | 7.02 | 0 |
| 40 | .14 | 6.9 | 64 | 7.29 | 6.9 | 88 |
| 41 | .21 | 6.9 | 64 | 7.2 | 6.9 | 70 |
| 42 | .28 | 7.0 | 64 | 7.5 | 7.0 | 124 |
| 43 | .35 | 7.0 | 64 | 7.3 | 7.0 | 128 |
| 44 | .49 | 7.15 | 64 | 7.3 | 7.0 | 106 |
| 45 | .7 | 7.15 | 64 | 7.4 | 7.3 | 119 |
| 46 | .14 | 6.9 | 128 | 7.85 | 7.3 | 106 |
| 47 | .21 | 6.9 | 128 | 7.8 | 7.3 | 128 |
| 48 | .28 | 7.0 | 128 | 7.8 | 7.4 | 119 |
| 49 | .35 | 7.0 | 128 | 7.85 | 7.4 | 137 |
| 50 | .49 | 7.15 | 128 | 7.85 | 7.5 | 124 |
| 51 | .7 | 7.15 | 128 | 7.8 | 7.6 | 101 |

All gels were prepared with the following composition:

Sodium caseinate ______________ 1.5 gms.
Calcium chloride ______________ 0.25 gms. (2.2 millimols).
Tetrasodium pyrophosphate ______________ 0.30 gms. (1.1 millimols).
Disodium phosphate ______________ amount shown in table.
Water ______________ 100 gms.

pH I = pH of sample before adjustment.
pH II = pH of sample after adjustment.
pH III = pH of sample after gelation.

EXAMPLE 1

100 grams of a gel composition are required having a gel strength of 235 gm. per sq. cm. and using the minimum amount of casein necessary for this purpose.

As mentioned earlier the optimum gel strength is approximately 100 for each gm. of casein in 100 gm. of the gel composition. Thus the required amount of casein for a gel strength of 235 is 2.35 gm. The gel composition is prepared as follows:

2.35 gm. of casein are dissolved in a solution of 49 cc. water and about 1 cc. of normal aqueous NaOH solution at 65° C. with stirring, and the pH of the resulting solution is adjusted to 6.6 using small amounts of NaOH and HCl solutions. The solution is then cooled to 4° C.

The amounts of the other necessary gel components are calculated according to Formula B.

$Ca = 1.94 \times 2.35 + 0.143 = 4.70$ millimols
Pyrophosphate $= 0.438 \times 4.70 + 0.1 = 2.16$ millimols
Orthophosphate $= 4.70/3 = 1.57$ millimols or expressed in gm. of the components to be added $CaCl_2 = 4.70 \times 0.111 = 0.522$ gm.
$Na_4P_2O_7 = 2.16 \times 0.266 = 0.574$ gm.
$Na_2HPO_4 = 1.57 \times .142 = 0.223$ gm.

As also mentioned earlier the highest gel strength is obtained if the components are added in such order that the pyrophosphate is added to the casein solution before the calcium at relatively low temperatures.

Thus to the casein solution at 4° C. 0.574 gm. of $Na_4P_2O_7$ were added and dissolved, then a solution containing 0.522 gm. $CaCl_2$ dissolved in 10 cc. $H_2O$ was added and the mixture was allowed to stand for 30 minutes at 4° C. Then 0.223 gm. of $Na_2HPO_4$ dissolved in 20 cc. $H_2O$ were added and the volume of the mixture brought up to 100 cc. The mixture was allowed to stand for 8 hours at 4° C. The gel strength of the gel which was formed during this time was about 224 gm. per sq. cm. when measured by the method described above.

Improvement of meat products

The utilization of the casein gels of the invention for the improvement of the properties of meat, and in other uses including the treatment of other food products and of textiles is basically similar to that heretofore described. However, in the case of the treatment of meat, allowance is made for the amounts of orthophosphate already in the meat and the desired calculated amounts thereof are reduced by the equivalent orthophosphate already present. Generally, it will be found that the meat will supply all of the orthophosphate required and hence none need be added to the casein, calcium and pyrophosphate in order to produce the desired gel.

To demonstrate quantitatively the effect of the casein gels in improving the properties of meat, ground raw beef of the following average composition was used for a series of experiments.

Water ______________ 69%.
Protein ______________ 19%.
Fat ______________ 11%.
Ash ______________ 1%.
Calcium (per 100 gms. of meat) ______________ 11 mg. (.28 millimol of calcium chloride equivalent).
Phosphorus (per 100 gms. of meat) ______________ 180 mg. (5.8 millimols of orthophosphate equivalent).
Magnesium ______________ .5 mg. (.021 millimol).

The following method was used to determine the water binding capacity of meat compositions:

Fifty grams of meat were mixed at room temperature with 50 cubic centimeters of an aqueous solution prepared by adding together an aqueous dispersion of casein and pyrophosphate and then adding calcium chloride. No orthophosphate was added since the amount thereof in the meat supplied all of the requirements for the casein gel. The mixture was allowed to stand 16 hours at 38° F. It was then centrifuged for 30 minutes at 1000 RCF (relative centrifugal force), i.e., 1,000 times gravity, and than separated water was measured. The water binding capacity was expressed in percentage according to the formula: 2 times (50 minus cc. of separated water).

Using this method the water binding capacity of meat containing a variety of casein gels prepared according to the invention was determined. The results of the experiments and the measurements are presented in Table 5.

TABLE 5

| Test | $Na_4P_2O_7$ weight in gm. | $CaCl_2$ weight in gm. | Sodium caseinate weight in gm. | Free fluid in cc. | pH | Bound water (50 cc. free fluid) | Percent water bound | |
|---|---|---|---|---|---|---|---|---|
| 52 | .13 | .0 | 3 | 35 | 6.3 | 15 | 30 | }A |
| 53 | .13 | .07 | 3 | 25.6 | 6.1 | 24.4 | 48.8 | |
| 54 | .13 | .1 | 3 | 1.3 | ---- | 48.7 | 97.4 | |
| 55 | .13 | .3 | 3 | 2.7 | 6.0 | 47.3 | 94.6 | |
| 56 | .13 | .4 | 3 | 15.5 | 6.1 | 34.5 | 69.0 | |
| 57 | .26 | .2 | 3 | 3 | ---- | 47 | 94 | }B |
| 58 | .13 | .2 | 3 | 2.7 | 6.0 | 47.3 | 94.6 | |
| 59 | .09 | .2 | 3 | 35 | 6.05 | 15 | 30 | |
| 60 | .05 | .2 | 3 | 35 | 6.1 | 15 | 30 | |
| 61 | .0 | .2 | 3 | 37 | 6.0 | 13 | 26 | |
| 62 | .26 | .1 | 3 | 32 | 6.3 | 18 | 36 | }C |
| 63 | .13 | .1 | 3 | 2.5 | 6.2 | 47.5 | 95 | |
| 64 | .09 | .1 | 3 | 17 | 6.0 | 33 | 66 | |
| 65 | .05 | .1 | 3 | 35 | 6.1 | 15 | 30 | |
| 63' | 0.13 | 0.1 | 3 | 4 | 6.0 | 46 | 92 | }C' |
| 64' | 0.13 | 0.1 | 2 | 11 | 6.0 | 39 | 78 | |
| 65' | 0.13 | 0.1 | 1 | 39 | 6.0 | 11 | 22 | |
| 66 | ---- | ---- | ---- | 47 | 5.9 | 3 | 6 | D |
| 67 | ---- | ---- | 3 | 46 | 6.1 | 4 | 8 | }E |
| 68 | .13 | ---- | ---- | 40 | 6.00 | 10 | 20 | |
| 69 | ---- | 4.4 | ---- | 44 | 5.6 | 6 | 12 | |
| 70 | 0.13 | 0.1 | 3 | 8 | 6.2 | 42 | 84 | }F |
| 71* | 0.13 | 0.1 | 3 | 24 | 6.1 | 26 | 52 | |
| 72** | 0.13 | 0.1 | 3 | 18 | 5.7 | 32 | 64 | |
| 73 | ---- | ---- | ---- | 44 | 5.9 | 6 | 12 | |

*0.11 gm. $Na_2HPO_4$ added.
**0.055 gm. $Na_2HPO_4$ added.

The intrinsic water binding capacities of the components were calculated from Groups D and E. The water binding capacity of meat alone was 6% (Group D, Test 66). The intrinsic water binding capacity of sodium caseinate was found by subtracting the water binding capacity of the meat (6%) from the capacity (8%) of a mixture of meat and sodium caseinate (Group E, Test 67). Thus, the intrinsic water binding capacity of the sodium caseinate in the composition was 8 minus 6 or 2%.

In a similar way the intrinsic water binding capacity of the pyrophosphate was determined by deducting the capacity of the meat from the capacity of the meat-sodium pyrophosphate mixture. The latter according to Group E, Test 68, was 20%, and thus the resulting value was 14%. Again, in a similar manner the intrinsic water binding capacity of the calcium chloride was determined to be 6% (Group E, Test 69).

The sum of the intrinsic water binding values of the components of the meat composition was found by adding the values of the components:

| | Percent |
|---|---|
| Meat | 6 |
| Sodium caseinate | 2 |
| Sodium pyrophosphate | 14 |
| Calcium chloride | 6 |
| | 28 |

The 28% value of the sum of the intrinsic water binding capacities of the individual components of the gel forming composition may be compared with a maximum value of 97.4% water retention for the sample test in Group A, Test 54; 69–94.6% for Group A, Tests 55 and 56; about 94% for Group B, Tests 57 and 58; 66–95% for Group D, Tests 64 and 65; and 84% for Group E, Test 70. This increased water binding is due to the interaction of the components of the gel forming composition and cannot be accounted for on the basis of the water binding properties of the individual components. In Group A, the lower values, in particular the results of Test 52, indicate that the ratio of calcium to pyrophosphate and/or the ratio of calcium to casein are too low to produce the desired gel strength and water retention. In Group B, Tests 59, 60 and 61, however, it is apparent that the amount of pyrophosphate is too low and also the ratio of calcium chloride to pyrophosphate. In Group C, the Tests 62 and 65 showed low water retention due probably to a high ratio of calcium chloride to pyrophosphate, and a low ratio of calcium chloride to pyrophosphate, respectively. In Group C', the need for a minimum amount of casein in order to obtain high water binding capacity in the meat composition is demonstrated. In Group F, the effect of larger quantities of $Na_2HPO_4$ is apparent.

The following is an example illustrating the production of skinless frankfurters using the casein gels according to the present invention.

EXAMPLE 2.—SKINLESS FRANKFURTERS

| | | |
|---|---|---|
| Veal trimmings | lbs | 67.5 |
| Bull meat | lbs | 30 |
| Regular pork trimmings | lbs | 52.5 |
| Flour | lbs | 10 |
| Gel forming solution | lbs | 14 |
| Salt | lbs | 3.5 |
| Cure | ozs | 14 |
| Sugar | ozs | 4 |
| Paprika | ozs | 2 |
| Spice | ozs | 20 |
| Garlic | oz | ¼ |
| Water (ice) | lbs | 74 |

*Manufacturing procedure—skinless frankfurters*

(1) Veal trimmings, bull meat and regular pork trimmings are ground separately through a ⅛ inch plate.

(2) The beef and veal trimmings are chopped in the silent cutter with the addition of cure, salt, flour, shaved ice and gel forming solution.

(3) This mixture is chopped until almost fine, the pork trimmings and spices are then added and chopped until the mixture is of the right consistency.

(4) Shaved ice is added during the chopping process so that the tempertaure of the mixture is kept below 40° F.

(5) The product is stuffed into artificial casings and placed in the smokehouse until the internal temperature of the frankfurters reaches 146° F.

(6) The frankfurters are then cooked under a shower of water at 165° F. until an internal temperature of 152° F. is reached.

(7) The cooked frankfurters are then cooled rapidly under a shower of cold water and the casings removed.

To prepare the gel-forming solution referred to in item 2, 0.63 pound of tetrasodium pyrophosphate is dissolved in a solution of 1.8 pounds of sodium caseinate in 10 lbs. of water, the temperature of the final solution being kept below 70° F. 0.57 pound of calcium chloride dissolved in one pound of water is cooled to 70° F. and added to the sodium caseinate solution 15 minutes prior to its addition to the meat.

A comparison of the above example with a run without addition of the gel-forming solution showed the following differences:

Addition of the gel-forming solution increased the yield 14 percent and gave the sausages a firm appearance. The run without the added gel-forming solution yielded a soft product, which was considered to be not salable.

EMULSIONS

EXAMPLE 3

To investigate the influence of the casein gels on the stability of fat emulsions, the casein solution and a vegetable shortening were emulsified in a colloid mill so that the resulting emulsion contained 3.3% casein and 11% vegetable shortening. Gels were prepared by adding in the order stated sodium pyrophosphate, calcium chloride, and sodium orthophosphate in various amounts to 100 ml. samples of the emulsion. The actual compositions of the samples are given in Table 6.

TABLE 6

| Test | Sodium caseinate, percent | Shortening, percent | $Na_4P_2O_7$, percent | $CaCl_2$, percent | $Na_2HPO_4$, percent |
|---|---|---|---|---|---|
| 74 | 3.3 | 11 | .072 | .06 | .15 |
| 75 | 3.3 | 11 | .108 | .09 | .15 |
| 76 | 3.3 | 11 | .119 | .1 | .15 |
| 77 | 3.3 | 11 | .18 | .15 | .15 |
| 78 (control) | 3.3 | 11 | | | |

The mole ratio of calcium chloride/sodium pyrophosphate was equal to two in tests 74–77, inclusive.

All of the samples were stored for 24 hours at 4° C. and then were centrifuged in an International Centrifuge No. 1 for one hour at 2000 r.p.m. Examination after centrifugation showed that only the sample in Test 78 had separated completely into aqueous fatty layers. None of the gel Samples 74 through 77, inclusive, showed any separation. In another experiment carried out in the same way, the temperature of the samples before centrifugation was adjusted to 52° C. In this case Sample 74 showed slight separation, while the control again separated completely. None of the Samples 75, 76 nor 77 showed any separation.

Use of the casein gels as egg white substitutes

The preparation of egg white substitutes from skim milk and polyphosphates is known (M. Lewis, V. Marcelli and B. M. Watts, Food Technology 7, 261–4 (1953)). In repeating these and similar tests using sodium pyrophosphate as the polyphosphate we obtained highly improved foams by using skim milk from which the gel strength lowering factors had been removed. In each test 300 cc. of water were mixed with 66 gms. of skim milk powder from which the gel strength lowering factors had been removed with the additions shown in Table 7. Each was whipped for 8 minutes at 50° F. 100 gms. of sucrose was then added and the whipping was continued for an additional 2 minutes.

Three criteria were established as quantitative norms for the differentiation of the qualities of the milk and casein compositions: overrun, sitffness and drainage.

Overrun was calculated as 100 times the difference between the weight of a given volume of milk measured before whipping and the weight of this volume after whipping divided by the latter weight. Foam stiffness was measured on a curd tension measuring device Apparatus 72815 employing a disc 6 cm. diameter and a foam-containing cylindrical dish 4.6 cm. high and 400 cc. in volume. Stiffness was reported as the number of grams required for the disc to penetrate the foam contained in the dish a distance of 4 cm.

To measure drainage, 50 g. of foam were placed in a funnel with a layer of cheesecloth as a filter and allowed to drain into a 100 cc. graduate. Readings were taken hourly and reported as the number of cc. drained during the time interval.

A comparison of the experimental results tabulated in Table 7 shows that the skim milk which contained sub-

TABLE 7

| Test | Analysis | | | Additions | | | pH | Overrun, percent | Stiffness, gms. | Drainage, cc. | | | |
|---|---|---|---|---|---|---|---|---|---|---|---|---|---|
| | Percent Ca | Percent $PO_4$ | Percent Mg. | gms. $Na_4P_2O_7$ | gms. $CaCl_2$ | gms. $Na_2HPO_4$ | | | | 1 hr. | 4 hrs. | 6 hrs. | Overnight |
| 79 | 1.29 | 3.0 | 0.13 | 2.64 | 0 | 0 | 6.55 | 622 | 160 | 12 | 33 | 38 | 39 |
| 80 | 0.67 | 1.30 | 0.014 | 2.64 | 1.02 | 0.675 | 6.45 | 676 | 305 | 0 | 0 | 2 | 16 |
| 81 | 0.35 | 1.20 | 0.02 | 2.64 | 1.27 | 0.675 | 6.3 | 1,000 | 255 | 0 | ½ | 5 | 25 | stantially lower quantities of gel strength lowering factors prepared by the process of the Stimpson Patent No. 2,708,632, and in which the calcium, pyrophosphate and orthophosphate levels have been readjusted to a ratio which would yield a high gel strength if not whipped (Tests 80 and 81) give a superior foam than that produced from normal low heat skim milk powder (Test 79) in the presence of an optimal amount of pyrophosphate. Most foams which are prepared according to the present invention do not drain, but dry to a sponge-like structure if exposed to air.

It was found that the outstanding results are caused by the gel structure of the foam. Thus, in the production of non-draining foams, it is necessary that the gel formation occur either during or soon after the whipping period. If the composition is a slow gelling one, then the whipped as yet ungelled foam will drain and the drained liquid will form a gel. It is also important that whipping be interrupted after gel formation has taken place, because continued whipping would destroy the gel structure.

Although nearly any casein gel forming composition can be used for the production of non-draining foams it is preferred to use compositions which have a rather short gelling time. Such compositions contain mostly higher ratios of Ca compound to pyrophosphate and higher ratios of phosphates in order to shorten the gelling time.

For outstanding results it is further recommended to prepare at first the complex consisting of casein, pyrophosphate and calcium compound and add the orthophosphate shortly before whipping. It is also possible and in cases of very fast gelling solutions, advantageous to add the orthophosphate to the already whipped composition and continue the whipping until gel formation occurs or is imminent.

Although the best mode of carrying out the invention has been presented in the foregoing description it is intended that the patent protection not be limited to the specific disclosure given and that the appended claims include within their scope all modifications and equivalents of the disclosure.

We claim:

1. The method of improving the properties of meat which comprises incorporating therein (1) a water-soluble material derived from the casein complex as it occurs in milk of the group consisting of casein and caseinate salts, (2) a pyrophosphate, (3) a calcium compound that is soluble in the presence of the first component and the pyrophosphate, controlling the amount of orthophosphate in the treated meat including that which occurs naturally in the meat, and the proportions of the first three components to improve substantially the water-retention properties of the meat, the amount of said calcium compound being about 0.2 to 5 millimols per gram of casein component, the mol ratio between the calcium compound and the pyrophosphate being about 1.5:1 to 3.3:1, and the mol ratio of calcium compound to orthophosphate being about 1:1 to 9:1, the relative proportions of the first three ingredients and of the orthophosphate being such as would produce an aqueous gel having a strength of at least 10 grams per square centimeter per percent of casein.

2. The method of claim 1 wherein the first three ingredients are added to the meat as an aqueous solution, the water-soluble material derived from the casein complex is first mixed with the water, and the pyrophosphate is added to said aqueous solution containing the water-soluble material derived from the casein complex before the calcium compound is added thereto.

3. An aqueous gel-forming composition comprising (1) a water-soluble mateiral derived from the casein complex as it occurs in milk consisting essentially of a material of the group consisting of casein and caseinate salts, (2) a pyrophosphate, (3) a calcium compound that is soluble in the presence of the first component and the pyrophosphate, and (4) an orthophosphate, in proportions to produce a gel having a strength of at least 10 grams per square centimeter per percent of casein by weight present in the composition, the amount of said calcium compound being about 0.2 to 5 millimols per gram of casein component, the mol ratio between the calcium compound and the pyrophosphate being about 1.5:1 to 3.3:1, the mol ratio of calcium compound to orthophosphate being about 1:1 to 9:1 and the pH of the gel being within the range 5.3 to 9.

4. The composition described in claim 3 wherein the water-soluble material derived from the casein complex is a soluble caseinate.

5. The composition described in claim 3 wherein the calcium compound is a water-soluble calcium salt.

6. The composition described in claim 3 which when dissolved in water produces a gell which has a pH in the range of 5.3 to 9.

7. The composition described in claim 6 wherein the pH range is 6.5 to 7.5.

8. The composition described in claim 3 wherein the amount of the calcium compound is in the approximate range of 0.2 to 5 gram millimols per gram of water-soluble material derived from casein, the mol ratio of calcium to pyrophosphate is in the approximate range 1.5 to 3.3, and the mol ratio of calcium compound to orthophosphate is in the approximate range of 1:1 to 9:1.

9. The composition described in claim 8 wherein the proportions produce a gel having a strength of at least 30 grams per square centimeter per percent of casein.

10. A gel containing the composition described in claim 8 and having therein at least about 1 percent of casein based on the weight of the gel.

11. A gel containing the composition described in claim 3 and having therein at least about 1 percent of casein based on the weight of the gel.

12. The composition described in claim 3 wherein for each percent by weight of water-soluble material derived from the casein complex present there are two gram millimols per 100 grams of gel of a soluble calcium compound, one gram millimol per 100 grams of gel of pyrophosphate, and .66 millimol of orthophosphate per 100 grams of gel.

13. The method of preparing a gel from the composition described in claim 3 wherein all of the components of the composition are mixed with water, the material derived from the casein complex is first mixed with the water, and the pyrophosphate is mixed with the water and the material derived from the casein complex before the calcium compound is added thereto.

14. The method of improving the properties of meat which comprises establishing therein the composition described in claim 3 in an amount sufficient to improve the water retention of the meat.

15. The method of producing a foam which comprises agitating an aqueous solution of the composition described in claim 3.

16. The composition described in claim 3 in the form of a stable foam.

17. An aqueous emulsion of a fat stabilized with the composition described in claim 3.

18. A water-soluble complex adapted to form high strength aqueous gels, consisting essentially of (1) a water-soluble material derived from the casein complex as it occurs in milk of the group consisting of casein and caseinate salts, (2) a pyrophosphate, and (3) a calcium compound that is soluble in the presence of the first component and the pyrophosphate, the amount of calcium compound being two millimols per gram of water-soluble material derived from the casein complex, and the mol ratio of calcium compound to pyrophosphate being approximately 2 and 1.

19. The method of improving the properties of meat which comprises adding thereto the complex described in claim 18 in an amount sufficient to improve the properties of the meat.

20. An aqueous gel-forming composition comprising (1) a water-soluble material derived from the casein complex as it occurs in milk consisting essentially of a material of the group consisting of casein and caseinate salts, (2) a pyrophosphate, (3) a calcium ion that is capable of being sequestered by the first component and the pyrophosphate, and (4) an orthophosphate, in proportions to produce a gel having a strength of at least 10 grams per square centimeter per percent of casein by weight present in the composition, the amount of said calcium compound being about 0.2 to 5 millimols per gram of casein component, the mol ratio between the calcium compound and the pyrophosphate being about 1.5:1 to 3.3:1, the mol ratio of calcium compound to orthophosphate being about 1:1 to 9:1 and the pH of the gel being within the range 5.3 to 9.

21. An aqueous gel-forming composition comprising (1) a water-soluble material derived from the casein complex as it occurs in milk consisting essentially of a material of the group consisting of casein and caseinate salts, (2) a pyrophosphte, (3) a calcium compound that is soluble in the presence of the first component and the pyrophosphate, and (4) an orthophosphate, in proportions to produce a gel having a strength of at least 10 grams per square centimeter per percent of casein by weight present in the composition, the amount of said calcium compound being about 0.2 to 5 millimols per gram of casein component, the mol ratio between the calcium compound and the pyrophosphate being about 1.5:1 to 3.3:1, and the mol ratio of calcium compound to orthophosphate being about 1:1 to 9:1.

22. An aqueous gel-forming composition comprising (1) a water-soluble material derived from the casein complex as it occurs in milk consisting essentially of a material of the group consisting of casein and caseinate salts, (2) a pyrophosphate, (3) a calcium ion that is capable of being sequestered by the first component and the pyrophosphate, and (4) an orthophosphate, in proportions to produce a gel having at least 10 grams per square centimeter per percent of casein by weight present in the composition, the amount of said calcium compound being about 0.2 to 5 millimols per gram of casein component, the mol ratio between the calcium compound and the pyrophosphate being about 1.5:1 to 3.3:1, and the mol ratio of calcium compound to orthophosphate being about 1:1 to 9:1.

References Cited in the file of this patent

UNITED STATES PATENTS

| | | |
|---|---|---|
| 1,909,508 | Schick | May 16, 1933 |
| 2,813,794 | Anson | Nov. 19, 1957 |
| 2,829,978 | Castagna et al. | Apr. 8, 1958 |
| 2,830,902 | Anson et al. | Apr. 15, 1958 |

UNITED STATES PATENT OFFICE

CERTIFICATE OF CORRECTION

Patent No. 2,957,770            October 25, 1960

Ernest H. Freund et al.

It is hereby certified that error appears in the printed specification of the above numbered patent requiring correction and that the said Letters Patent should read as corrected below.

Column 3, line 60, for "2,708,623" read -- 2,708,632 --; column 9, lines 63 and 64, for "ad ustment", each occurrence, read -- adjustment --; column 14, line 3, for "sitffness" read -- stiffness --; column 16, line 32, for "and" read -- to --; column 18, line 5, list of references cited, for "Anson" read -- Anson et al. --.

Signed and sealed this 11th day of April 1961.

(SEAL)
Attest:
ERNEST W. SWIDER
Attesting Officer

ARTHUR W. CROCKER
                                    Acting Commissioner of Patents